United States Patent [19]

Williams

[11] 3,759,039

[45] Sept. 18, 1973

[54] THRUST CONTROL AND MODULATION SYSTEM

[75] Inventor: Allan E. Williams, Kingsland, Ga.

[73] Assignee: Thiokol Chemical Corporation, Bristol, Pa.

[22] Filed: Nov. 22, 1968

[21] Appl. No.: 778,172

Related U.S. Application Data

[63] Continuation-in-part of Ser. No. 558,794, June 20, 1966, abandoned.

[52] U.S. Cl. ............................ 60/231, 239/265.23
[51] Int. Cl. ............................................ F02k 1/14
[58] Field of Search ................. 239/265.17, 265.23; 60/231

[56] References Cited
UNITED STATES PATENTS 3,092,963    6/1963   Lawrence ........................... 60/231
3,167,912    2/1965   Ledwith .............................. 60/232
3,300,978    1/1967   Pennington ......................... 60/231

*Primary Examiner*—Samuel Feinberg
*Attorney*—Thomas W. Brennan

[57] ABSTRACT

A device, more particularly a thrust control system, is disclosed wherein gases bled from the rocket motor combustion chamber are thereafter conduited to a canister having a perforated solid propellant grain therein, which is combusted by the gases bled from the main chamber and thereafter conducted to discharges arranged with respect to the rocket motor to provide thrust vector control, roll and/or pitch control and thrust modulation. Associated valve control means is also provided.

1 Claim, 3 Drawing Figures

Patented Sept. 18, 1973

Allan E. Williams
INVENTOR.

BY Thomas W. Brennan

Allan E. Williams
INVENTOR.

BY Thomas N. Brennan

THRUST CONTROL AND MODULATION SYSTEM

This application is a continuation-in-part of copending application, Ser. No. 558,794, filed June 20, 1966 by Allen E. Williams for THRUST VECTOR CONTROL SYSTEM, now abandoned.

This invention relates to rocket motors and more particularly to a system for controlling the thrust, its direction, and therefore the direction of a missile propelled thereby, and its level or magnitude by throttling and the like as developed in a rocket motor.

One method of contolling the direction of a rocket motor proplled missile is to bleed off gas from the motor combustion chamber and inject this gas into the thrust nozzle of the motor in a direction more or less transverse to the longitudinal axis thereof. This system, known as thrust vectoring or thrust vector control, has certain advantages; however its use in connection with a solid propellant rocket motor has presented difficulties which result from the fact that combustion products of certain high-performance solid propellants contain solids, such as aluminum oxide, that have a tendency to coat, and in some instances to erode, surfaces which they contact. Consequently valves usually required in all such arrangements to meter the flow of the bleed or control gas from the solid propellant rocket motor chamber become plugged or are otherwise rendered inoperative in an extremely short time. The present invention provides a solid-free gas for use as the thrust control medium and is applicable to any type of thrust control system whether the system is fluid injection thrust vector control, auxiliary rocket jet or main nozzle gas flow modulation. Further by this invention-control is assured throughout the burning period of the rocket motor.

Accordingly, it is an object of this invention to provide an improved system for controlling the directional effect of thrust and the level or magnitude thereof as developed in a solid propellant rocket motor.

Another object of this invention is to provide a rocket motor thrust control system which obviates the disadvantages, such as the fouling of valves and ducts, associated with conventional thrust, thrust vector and rocket jet control systems wherein solid propellant combustion products are injected into or otherwise utilized into a rocket motor for directional control of the thrust developed thereby.

These and other objects of the invention will be readily understood by reading the following description of a preferred and two other embodiments of the invention, in which reference is made to the accompanying drawings in which.

Figure 1:
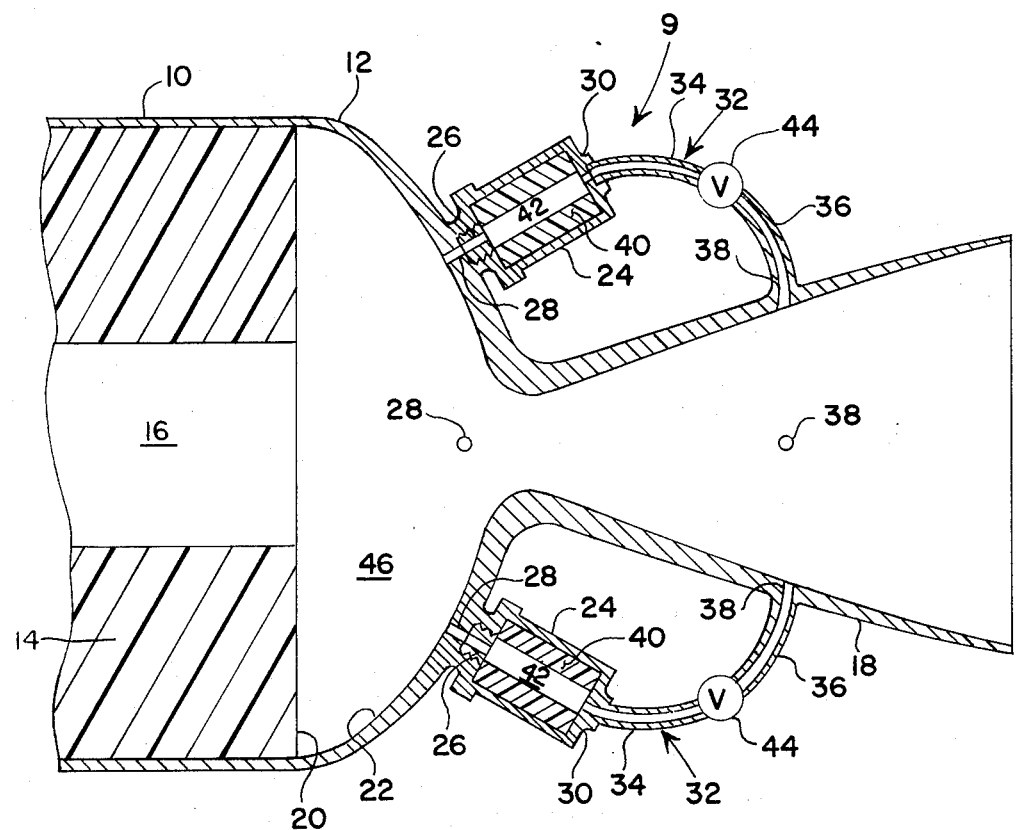
FIG. 1 is a fragmentary, longitudinal sectional view of the aft end of a rocket motor incorporating the preferred embodiment of the invention for thrust vector control.

In FIG. 1 there is illustrated a rocket motor comprising a casing 10 with an aft end closure 12 integrally joined thereto. The rocket motor has a solid propellant grain 14 comprising material, such as powdered aluminum, which may be suspended in solid form in the gaseous combustion products of said grain when the rocket motor is fired. A perforation 16 extends longitudinally of grain 14, the longitudinal axis of this perforation being substantially coincident with the longitudinal axis of a thrust nozzle 18 mounted on aft end closure 12. The aft end surface 20 of grain 14 is spaced fron the inner surface 22 of aft end closure 12.

Attached to aft end closure 12 is a thrust central system 9 comprising four canisters 24 (only two of which are illustrated) spaced circumferentially thereof and adapted for thrust vector contol operation. More particularly, the angular spacing between adjacent pairs of the canisters 24 is 90°and at the forward end of each canister 24 is a first aperture 26 (only two of which are shown) which is coaxial with a respective one of four holes 28 (only three of which are shown) located in aft end closure 12 and spaced coaxially thereof at 90° intervals. At the aft end of each canister 24 is a second aperture 30 (only two of which are shown) which communicates with a respective one of four ducts generally designated at 32, each duct 32 comprising a first segment 34 and a second segment 36. Each segment 36 communicates with a respective one of four discharges or holes 38 (only three of which are shown) extending through, or otherwise formed in, the wall of thrust nozzle 18 and spaced coaxially thereof at 90° intervals. Discharges or holes 38 can be enlarged or contracted in cross sectional area (not shown) for further control of injection gas velocity, if desired.

A solid propellant grain 40 is disposed within each canister 24, each grain having a perforation defining a chamber 42 extending therethrough which communicates with first aperture 26 and second aperture 30. Solid propellant grain 40 is suitably formed of a solid propellant that generates a solid-free gas when burned and generates pressure at or above the pressure generated by burning of grain 14, such as 19 percent by weight polybutadiene acrylic acid plus epoxide curing agent ($C_{19}H_{23}O_4$) and 18 percent by weight ammonium perchlorate. It is to be understood, however, that the invention is not limited to the use of this particular propellant, since there are many other propellant compositions that produce solid-free combustion products.

Figure 2:
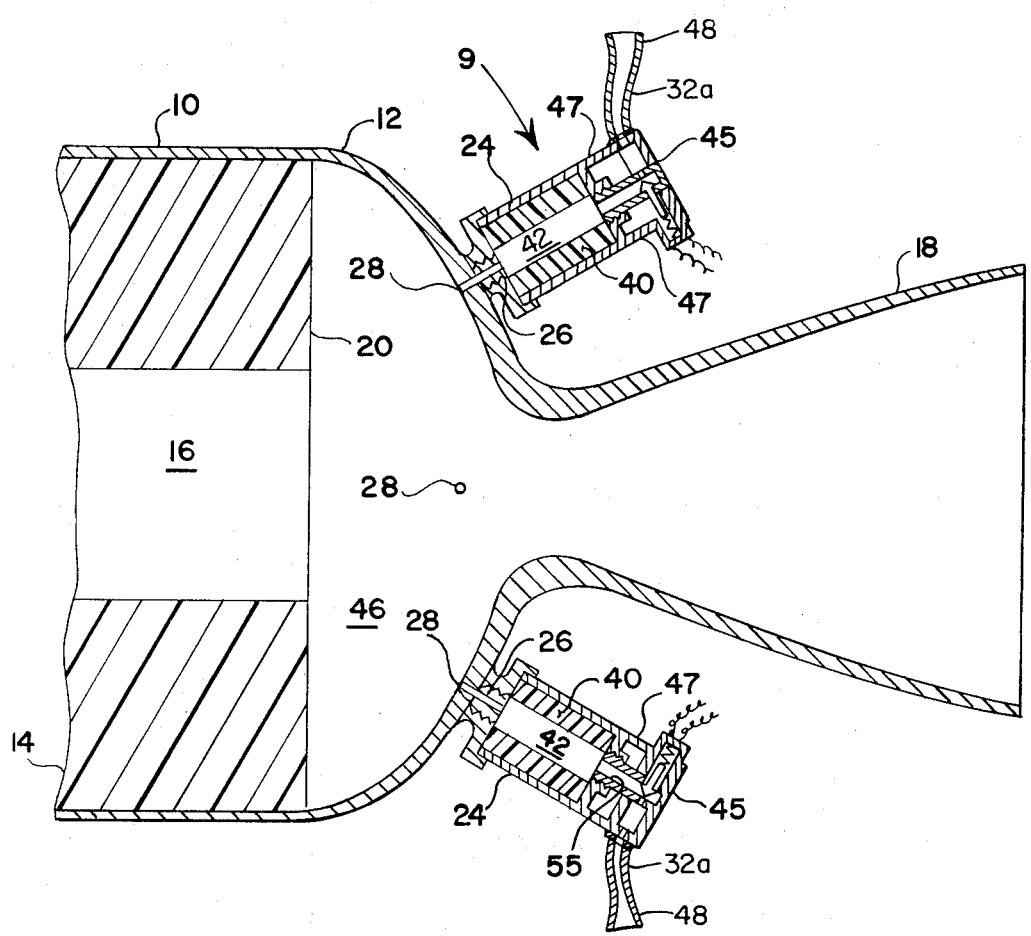
FIG. 2 is a view similar to FIG. 1 illustrative of another embodiment of the invention; and, FIG. 3 is a view similar to FIG. 1 and FIG. 2, illustrative of still another embodiment of the invention.

Four valves 44 (only two of which are shown) one of which is located in each duct 32, each valve 44 having throttling means, such as a solenoid controlled plug movable relative to an orifice as for example valves 45 in FIG. 2 to be described more fully hereinafter, for opening or closing the passage therein. Each valve 44 is connected to conventional control means (not shown) adapted to open and close the valve at any selected time to thereby control the flow of gas through duct 32 associated therewith.

In operation of the FIG. 1 embodiment when grain 14 is ignited gas is generated which pressurizes the chamber 46. A portion of the generated gas flows into chamber 42 of canisters 24 and ignites grains 40. When the thrust vector of the rocket is to be varied, valves 44 are selectively actuated to allow gas from canister 24 to discharge through holes 38 into the interior of thrust nozzle 18. Since the gas generated by combustion of grains 40 is free of solid particles and since the pressure thereof is at or above the level of that in chamber 46 the combustion products of grain 14 will not enter holes 28 and the valves 44 can be opened and closed as desired throughout the firing period of the rocket motor without plugging ducts 32 and valves 44. Furthermore, when any one of the valves 44 is closed, gas generated in the associated canister 24 flows back into thrust chamber 46, thence through thrust nozzle 18, adding impulse to the rocket motor.

It will be appreciated that the described embodiment of the invention eliminates the aforementioned problems encountered in the use of prior art systems for thrust vector control. It will also be appreciated that other modifications can be made in the above embodiment with respect to a thrust vector control system. For example, canisters 24 may be mounted within combustion chamber 46, in which case it is preferred that they be coated with an insulating material to protect them and grains 40 from heat. Whether canisters 24 are mounted outside or inside combustion chamber 46, solid propellant grains 40 can be formulated to burn at a lower temperature than that of the main solid propellant grain 14 for a predetermined operating pressure in thrust chamber 46, thereby permitting valves 44 to be constructed simply and from inexpensive materials. The relatively low temperature of the gas from grains 40 allows thrust and thrust vector control over a long period without damage to ducts 34 or valves 44. Furthermore, if a valve malfunctions and remains closed, no explosion occurs in the related canister because gas merely vents into the thrust chamber, avoiding excessive pressure buildup.

Referring now to the embodiment of the invention in FIG. 2, control system 9, again comprises a plurality of canisters 24 which are attached to aft end 12 of casing 10 as before. However in FIG. 2 ducts 32 of FIG. 1 are replaced with short couplings or ducts 32-a and a valve 45, illustrated generally diagrammatically, is directly coupled thereto and to a respective one of canisters 24, being supported thereon by braces 47. A plurality of discharges in the form of thrustors or auxiliary rocket motors 48 are mated to the outlet of valves 45 to provide thrust in a direction substantially transverse to the main rocket thrust vector, thereby achieving pitch control of the motor in flight. Thrustors 48 together with gas provided by canisters 24 as stated constitute another form of thrust control system 9. However, in this instance, control of the thrust of the main rocket motor is indirect rather than direct as in FIG. 1. It should be noted that while thrustors 48 are shown in a pitch control mode, it is readily understood that additional thrustors 48 and/or valves 45 can be utilized to provide roll control if desired, the FIG. 2 presentation being described for convenience only.

Figure 3:
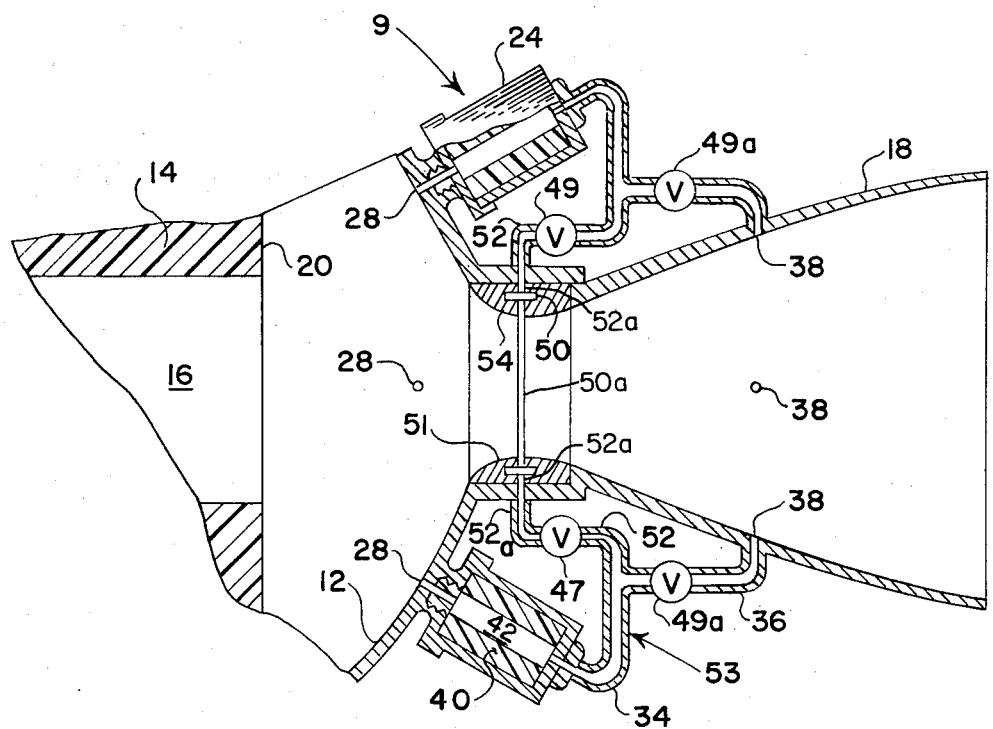

In FIG. 3 a still further embodiment of the invention is described wherein control system 9 again comprises canisters 24 attached to aft end 12 of the rocket motor casing 10. Ignition of propellant charge 40 is obtained by hot gas from main charge 14 after passing through first aperature 28 into perforation or chamber 42. Gas is thereafter generated in canister 24, as before, and flows into modified duct 53 through second aperature 30 and segment 34. A pair of selector valves 49 and 49-a are installed in duct 53 in a respective one of the segments 52 and 36 joined to segment 34. As in FIG. 1 valve 49-a in segment 52 is connected, through an annular plenum ring 50, to the annular orifice or slot 50-a in a rocket throat insert 51 in nozzle 18. An outlet or discharge 52-a to plenum 50 is provided in segment 52.

In FIG. 3 system 9 is shown as capable of either operating mode, i.e., both thrust vector control by injection of gas into nozzle 18 or control of thrust level or magnitude by modulation or throttling thereof is provided, since the annular injection of gas through slot 50-a forms a so-called "virtual" throat of smaller diameter than the physical throat 54 of insert 51. Thus by suitably and selectively manipulating valves 49 and 49-a thrust modulation or thrust vector control can be achieved as desired.

Having therefore described the invention in a preferred and two additional embodiments what is desired to be protected by Letters Patent of the United States is set forth below in the subtended claims.

What is claimed is:

1. In a rocket motor having a motor casing with an aft end closure, a main thrust nozzle mounted on said aft end closure, a solid propellant grain disposed within said motor casing and spaced from said aft end closure so as to provide a combustion chamber at the aft portion of said motor casing, a thrust control system comprising:

at least one canister externally mounted on said aft end closure and provided at its forward end with a first aperture that communicates with said combustion chamber and at its aft end with a second aperture;

a solid propellant grain disposed within the said canister and formed with a perforation that extends between said first and second apertures therein, said grain forming a solids- free gas when burned;

a duct system communicatively connected at one end to said second aperture in said canister;

discharge means connected to the other end of said duct system and positioned between said nozzle and said canister so as to discharge said solids-free gas to control the directional effect of said thrust developed in said motor;

means for selectively opening and closing said duct system to said passage therethrough of said solids-free gas; said nozzle further includes a throat portion comprising a throat insert having an annular slot opening radially into said nozzle; and, said duct system is connected to said slot.

* * * * *

UNITED STATES PATENT OFFICE
CERTIFICATE OF CORRECTION

Patent No. 3,759,039        Dated September 18, 1973

Inventor(s) Allan E. Williams

It is certified that error appears in the above-identified patent and that said Letters Patent are hereby corrected as shown below:

Column 1, line 13, "proplled" should read -- propelled --;

Column 2, line 37, "C19H23O4" should read -- $C_{19}H_{23}O_4$ --;

same line "18 percent" should read -- 81 percent --.

Signed and sealed this 18th day of June 1974.

(SEAL)
Attest:

EDWARD M. FLETCHER, JR.
Attesting Officer

C. MARSHALL DANN
Commissioner of Patents